May 8, 1962  E. J. HERBENAR  3,033,334
BLEED CONTROLLED FLUID-MECHANICAL COUPLING
Filed July 11, 1958  3 Sheets-Sheet 1
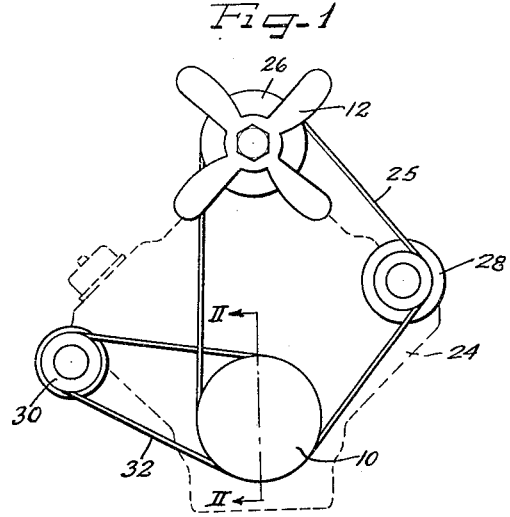
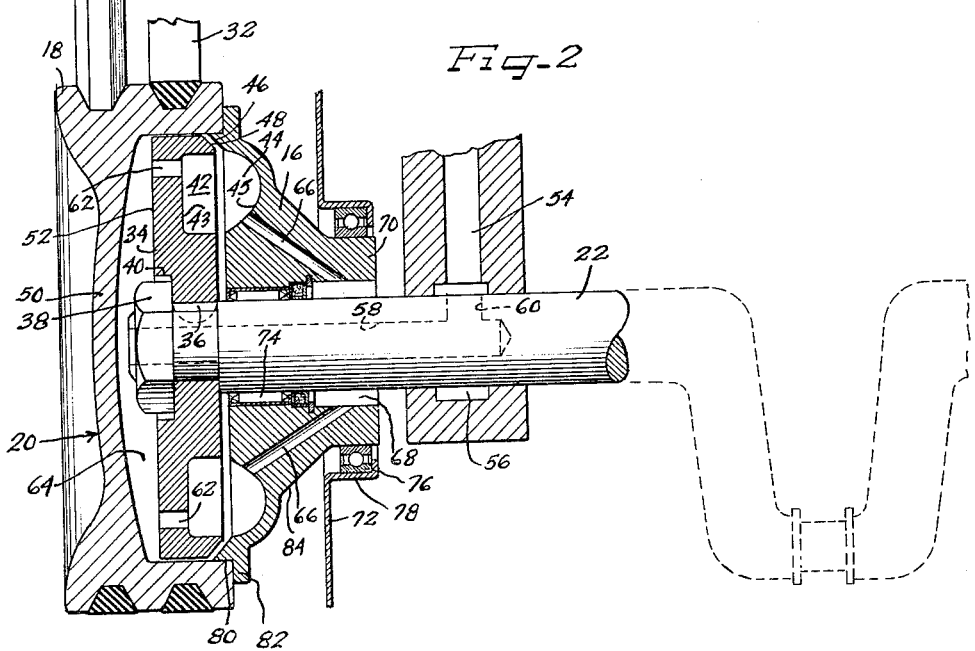
Inventor
Edward J. Herbenar May 8, 1962  E. J. HERBENAR  3,033,334
BLEED CONTROLLED FLUID-MECHANICAL COUPLING
Filed July 11, 1958  3 Sheets-Sheet 2
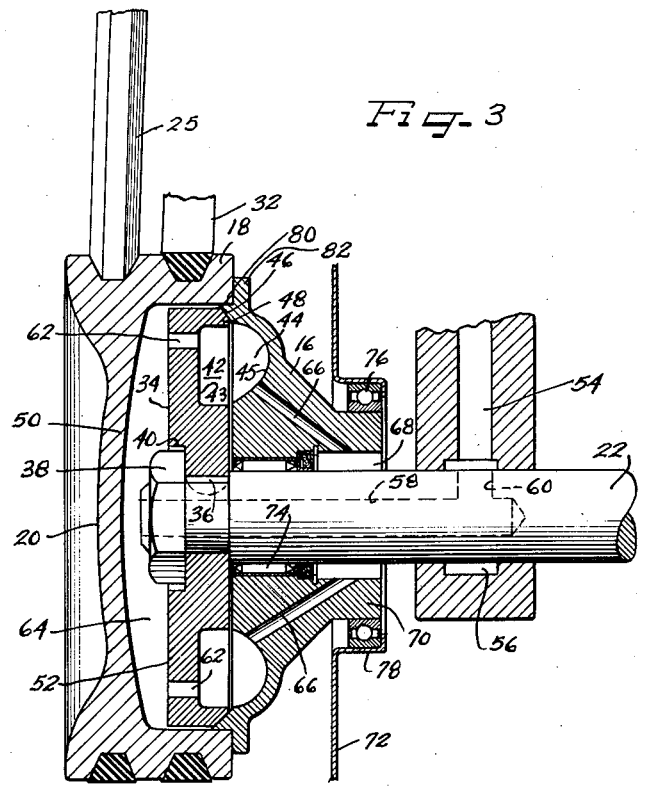
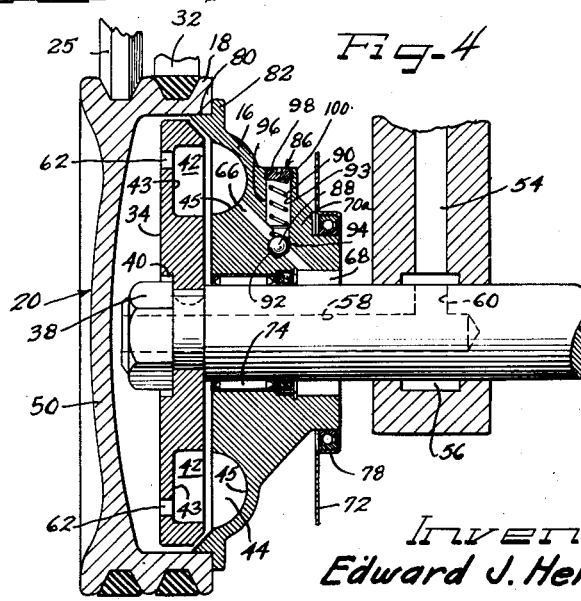
Inventor
Edward J. Herbenar
by *[signature]* Attys.

May 8, 1962  E. J. HERBENAR  3,033,334
BLEED CONTROLLED FLUID-MECHANICAL COUPLING
Filed July 11, 1958  3 Sheets-Sheet 3
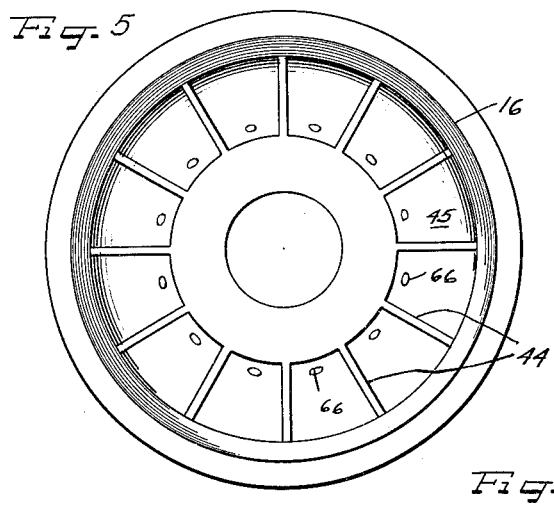
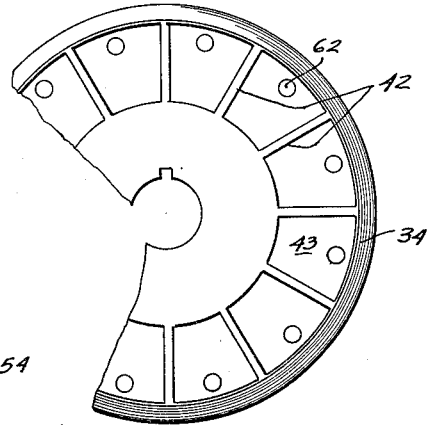
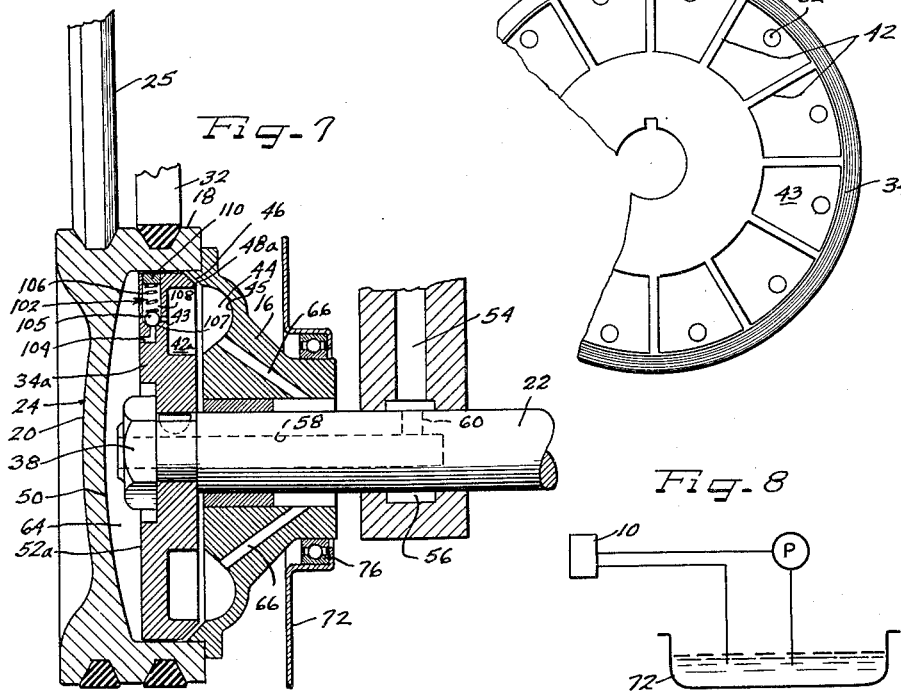
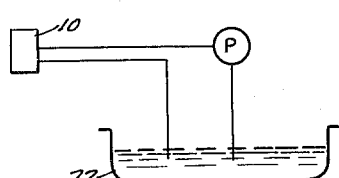
Inventor
Edward J. Herbenar United States Patent Office 3,033,334
Patented May 8, 1962

3,033,334
BLEED CONTROLLED FLUID-MECHANICAL COUPLING
Edward J. Herbenar, Detroit, Mich., assignor to Thompson Ramo Wooldridge Inc., a corporation of Ohio
Filed July 11, 1958, Ser. No. 748,025
16 Claims. (Cl. 192—3.2)

This invention relates to a mechanical and fluid coupling adapted to drive accessories such as an automobile fan or the like, and more particularly to a coupling which will permit running the accessories at a relatively high speed when the engine is running relatively slowly while preventing excessive speed and speed from being applied to the accessories at high engine speed.

When automobile accessories are coupled directly to drive means operated from the crankshaft or the like, relatively high engine speeds may occasion considerable damage to the accessories and reduce engine efficiency by unnecessarily high accessory load. The present invention overcomes this difficulty by means of a mechanical and fluid coupling operatively connected with a source of fluid pressure such as the oil pump or engine oil pressure line of an integral combustion engine. Control of the torque-carrying ability of the coupling, is afforded by inlet and outlet bleed orifices in an impeller and turbine respectively, the outlet orifices being of relatively reduced dimensions so as to create a pressure condition in a housing for the impeller which is corotable with the turbine. The pressure on the turbine vanes is less than the pressure on the housing affixed thereto, and wet friction clutch faces on the turbine and impeller are thereby brought into engagement. When a predetermined torque or speed is applied to the coupling, the pressure condition is relieved by an initial disengagement of the clutch faces and a consequence pumping action afforded by the resulting differential speeds of the impeller and turbine. In one embodiment of the invention, the outlet orifices are closed in the initial pressurized, clutch-engaged condition, but are opened by check valve means responsive to a predetermined turbine speed to open centrifugally. The coupling may be bolted to the front of the engine crankshaft and used to drive a variety of accessories such as a fan, generator or the like, and in a preferred form of the invention, the housing defines a pulley which is offset axially from an accessory pulley in the condition where the clutch faces are engaged, and is biased to a disengaging position by the drive belt entrained on the respective pulleys to afford a restoring force. The coupling, when mounted on the end of a crankshaft, is an effective substitute for the vibration dampers currently used in internal combustion engines, which are generally designed in the form of a friction clutch. The above described accessory drive coupling affords a wet friction clutch and fluid coupling at low speeds and maintains a fluid coupling engagement at high speeds, and is adapted to afford damping of crankshaft vibrations in either phase. The accessory drive coupling of the invention may also be mounted independently of the engine and driven by a belt from the crankshaft.

Accordingly, it is an object of the present invention to provide a coupling for use in actuating accessories in an automobile or the like, which affords a direct drive between the engine and the accessories at speeds below a predetermined level and a reduced torque speed at higher engine speeds, so as to prevent damage to the accessories.

Another object of the invention is to provide a mechanical and fluid coupling whose torque-carrying ability is controlled by means for bleeding oil through specific inlet and outlet control orifices.

Another object of the invention is to provide a coupling as described in which, in a preferred form, the coupling is secured to the front of an engine crankshaft and the turbine includes an impeller housing which defines a pulley operatively connected to an accessory drive pulley so that friction clutch means on the impeller and turbine are urged to disengaged position to afford a restoring force for the coupling.

Another object of the invention is to provide a coupling as described in which a friction clutch and fluid clutch action are afforded at predetermined torque and speed levels of the engine, means being provided to afford disengagement of the mechanical clutch at a predetermined torque or speed level while maintaining the fluid clutch action.

Other objects and advantages of the invention will become apparent as the description proceeds in accordance with the drawings in which:

FIGURE 1 is a front view of the coupling in association with engine accessory pulleys adapted to be driven thereby;

FIGURE 2 is a vertical sectional view of a coupling according to the present invention in disengaged position;

FIGURE 3 is a view corresponding to the view of FIGURE 2 and showing the coupling in engaged condition;

FIGURE 4 is a vertical sectional view of a second embodiment of the invention;

FIGURE 5 is a plane view of a turbine means according to the invention;

FIGURE 6 is a plane view of an impeller according to the invention, partly broken away;

FIGURE 7 is a vertical sectional view of a third embodiment of the invention; and FIGURE 8 is a schematic showing of an oil supply circuit for the coupling.

Referring now to FIGURES 1 through 3, a coupling 10, according to the invention, is shown in driving relationship to a fan 12, although other accessories may be driven thereby within the scope of the invention. Thus the coupling includes a turbine or rotor 16 having a pulley 18 formed on a housing portion 20 thereof, the turbine being slidably journalled on the end of a crankshaft 22 of an internal combustion engine 24 as hereinafter further described. A V-belt 25 is entrained on the pulley 18 and on a pulley 26 for the fan 12, and may also be entrained around a pulley 28 for a generator or the like as shown. A second accessory pulley 30 for a coolant pump or the like may also be driven from the pulley 18 by a drive belt 32. The coupling of the invention could be mounted as a separate unit within the scope of the invention, and driven by a belt from the crankshaft, but in the form shown it is adapted to act as a vibration damper for the crankshaft. An impeller 34 is keyed to a reduced end portion 36 of the crankshaft 22 and is held in position by a nut element 38 threadedly received on the crankshaft in a central annular recess 40 of the impeller. The impeller is disposed within the housing 20 of the turbine 16 and defines a plurality of equally spaced vanes 42 disposed in radially opposed registration with a corresponding plurality of turbine vanes 44. The turbine 16 and impeller 34 define mating cone-shaped clutch faces 46 and 48 respectively, and engagement thereof is afforded by relative axial movement between the turbine and impeller.

In order to effect engagement of the clutch faces 46 and 48, fluid from a source of pressure such as an oil pump P, as shown schematically in FIGURE 8, is introduced into the housing 20 between the concave wall 50 thereof and the face 52 of the impeller further from the turbine vanes 44, by means of an inlet conduit 54 providing a preferably annular chamber 56 around the crankshaft 22. The crankshaft defines an axial bore 58 extending from an inlet orifice 60 within the boundaries of the chamber 56 to the outer end of the crankshaft, and the turbine chambers 45 defined by the vanes 44 are dimensioned so that their projected area on a plane perpendicular to the crankshaft end is less than the area of the wall 50 of the housing portion 20 of the turbine by a predetermined extent such as to urge the clutch faces 46 and 48 into frictional engagement as hereinafter further described.

A fluid clutch is provided by the impeller and turbine vanes 42 and 44, by means of a plurality of inlet orifices 62 leading from the chamber 64 between the housing wall 50 and the impeller 34, to corresponding impeller chambers 43 and a plurality of outlet orifices 66 leading from the turbine chambers 45 to an annular outlet passage 68 defined by a hub portion 70 of the turbine and the crankshaft 22 and in communication with the crankcase 72. The inlet orifices 62 are relatively large in diameter with respect to the outlet orifices 66, and accordingly, the reduced outlet orifices provide a flow rate less than that of the inlet orifices so that a pressure condition is created in the impeller and turbine chambers which produces a highly effective fluid clutch action. At the same time, the aforementioned greater pressure area of the wall 50 of the turbine housing relative to the turbine chambers 45 maintains the wet friction mechanical clutch until a predetermined torque or speed is attained as hereinafter described.

The hub portion 70 of the turbine is preferably slidably journalled on the crankshaft 22 by means of suitable bearing elements 74, and is similarly mounted in sealed relation to the crankcase by a seal and bearing means 76 secured within an annularly recessed and flanged retaining wall 78 of the crankcase. The housing portion 20 is press-fitted or otherwise mounted on an annular shoulder 80 against a flange 82 of the turbine portion 84 with which the hub portion 70 thereof is integrally formed.

As hereinbefore indicated, relatively high engine speeds generally occasion damage to the accessories. Accordingly, the wet friction clutch provided by the cone clutch faces 46 and 48 is adapted to slip when a predetermined torque is applied therebetween, and thereupon a differential rate of angular rotation is produced between the turbine 16 and the impeller 34. This differential rate produces a pumping action in the impeller which creates a faster flow through the outlet orifices 66 and therefore serves to maintain a disengaged relation between the clutch faces, while affording a fluid coupling action between the impeller and turbine, and a point of equilibrium will be attained at which the oil is pumped out of the coupling at a rate equal to the oil coming into the coupling, the total volume of fluid in the unit being such that a difference in pump or engine and turbine and accessory speeds will exist. However, when the coupling moves from high engine speed to low engine speed, the natural pumping action of the coupling is reduced and the assembly is pressurized and begins to drive again through the cone clutch.

Referring now to FIGURE 4, a second embodiment of the invention is shown in which similar parts are referred to by similar reference numerals, but which provides speed responsive means for determining the point at which the cone clutch faces 46 and 48 are disengaged. Accordingly, the turbine 16 is provided with a plurality of ball check valves 86 in association with corresponding outlet orifices 66 and each comprising a ball element 88 urged by a helical spring 90 into closing relationship with an orifice 66, as received in a recess 92 opening into the bore 93 and retained by a shoulder 94 in the bore 96 in which the spring 90 is disposed. The upper end of the spring 90 bears against a kerfed plug 98 threadedly received in the bore 96, the turbine portion 70a being formed with an offset boss 100 for this purpose. The spring 90 is of a strength such as to permit the ball element 88 to move upwardly in response to a predetermined centrifugal force and turbine speed resulting from the direct drive between the impeller and turbine above described, and when the outlet orifices are thereby opened, a fluid flow is afforded therethrough which reduces the pressure condition in the assembly, and permits disengagement of the clutch faces so that the rate and r.p.m. of the coupling is modulated and the pressurizing, filling or draining of the coupling is a function of the turbine speed only.

In order to provide a restoring force for the coupling, the housing portion 20 is preferably disposed substantially out of line with the driven accessory pulleys 28 and 30 when the wet friction, mechanical clutch is operated. Thus the pulley belts 25 and 32 are canted in the engaged position of the clutch seen in FIGURE 3, and biasing means are afforded to urge the clutch to disengaged position which may be calibrated in accordance with the pressure conditions in the assembly in determining the operating characteristics thereof. In the embodiment of FIGURE 4, adjustment of these characteristics may further be afforded by rotation of the kerfed plug 98 within the bore 86 so as to adjust the setting of the spring 90.

Referring now to FIGURE 7, a third embodiment of the invention is shown wherein similar numbers refer to similar parts. This embodiment is particularly suitable for an accessory drive means, since it affords a high torque even with relatively low engine oil pressures and low crankshaft pulley speed. When the impeller 34a of the coupling is rotated at a relatively low speed, the surface area 52a thereof will serve to provide an hydraulically actuated piston, relative to the turbine 16 and the housing 20 thereof, the differential area afforded between the surface 52a and the surface 50 produced by the crankshaft 22 and its passage 58 creating a differential pressure such as to hold the clutch engaged. At higher engine speeds, however, disengagement of the friction clutch thus provided by the clutch cones 46 and 48a is effected by speed responsive means which include a check valve 102 adapted to close an inlet or bleed passage 104 communicating between the chamber 64 defined by the housing 20 and the impeller 34a, and the chambers 43 of the impeller. The check valve 102 comprises a ball valve element 105 which is urged by spring means 106 against a valve seat 107 which forms the lower end of a bore 108 which is continuous with an upwardly turned portion of the passage 104 and receives the spring means 106 therein. A plug 110 is threadedly or otherwise secured in the upper end of the bore 108 to provide a desired pressure force for the spring means 106, and when a predetermined rate of angular rotation is attained by the impeller 34a, as hereinbefore set forth, the ball valve element 105 will move radially outwardly against the force of the spring means 106 to open the passage 104. Thereupon fluid introduced into the chamber 64 will be permitted to flow through the said passage 104 and into the chambers 43 and 45 through an axially extending portion of the passage which is preferably disposed at the bottom of the bore 108, and through the outlet passage 66 into the crankcase 72 to relieve the pressure forces in the chamber 64. The high speed loads developed between the cone faces 46 and 48a will then disengage the friction clutch afforded thereby, and the coupling will be in fluid clutch engagement as hereinbefore described.

There has thus been provide a coupling which operates with exceptional efficiency to afford a mechanical and fluid clutch when the engine is operating at a predetermined relatively lower speed, and which prevents damage to accessories driven thereby at relatively higher speeds by effecting disengagement of the mechanical clutch at a desired engine speed level or at a desired accessory load, while maintaining effective operation of the accessories by means of a fluid coupling. The bleed orifices of the invention permit an economical and simple construction for the fluid coupling which is not subject to breakdown or wear and which provides uniform long-lasting operation, the coupling being substantially self-lubricating, and adapted for use in a wide variety of applications.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A mechanical and fluid accessory drive coupling comprising a shaft, means for rotating said shaft, a source of fluid supply under pressure, said shaft defining an axial bore therein opening at one end thereof and an inlet orifice adjacent the closed end of said bore, means for introducing fluid from said source of fluid supply into said inlet orifice, a turbine slidably journalled on said shaft, said turbine including a housing defining a pulley on the exterior thereof and defining an interior clutch surface, a plurality of vane recesses opening in the direction of the open end of said shaft and an outlet orifice venting from each of said recesses into said source of supply, an impeller fixedly secured to said shaft within said housing, said impeller defining a clutch surface complementary to said first clutch surface, a plurality of recesses in radial registration with said recesses in said turbine and opening toward said recesses in said turbine and an inlet orifice leading from the face of said impeller further from said turbine recesses to each of said impeller recesses and having a diameter greater than the diameter of said outlet orifices by a predetermined extent, said impeller recesses being dimensioned relative to the area of said face further from said turbine recesses and to said inlet and outlet orifices in said impeller and turbine to afford a pressure condition between said face and said housing sufficient to move said clutch faces into engagement when a predetermined torque is applied to said shaft and to permit disengagement of said clutch surfaces when a higher predetermined torque is applied to said shaft whereby to afford pumping of fluid to said inlet orifices in said turbine and a fluid coupling between said impeller and said turbine.

2. A coupling comprising a shaft, an impeller fixedly secured on said shaft, a turbine slidably journalled on said shaft having a housing enclosing said impeller, said turbine and impeller defining mating clutch faces and opposed vanes, and inlet means for introducing fluid under pressure into said housing between said housing and the face of said impeller opposite said vanes, said impeller defining an inlet orifice leading from said face to each of said vanes in said impeller, said turbine defining a plurality of outlet orifices opening into each of said vanes in said turbine, said vanes in said turbine providing a pressure area less than the pressure area provided by the portion of said housing opposite said impeller, said outlet orifices having a reduced width relative to said inlet orifices such as to bias said clutch surfaces into engagement when less than a predetermined amount of torque is applied therebetween and to afford disengagement thereof when a greater torque is applied therebetween, said impeller and turbine vanes defining a fluid clutch adapted to cooperate with said clutch surfaces in affording a complementary fluid clutch action during engagement of said mechanical clutch and to maintain said fluid clutch action upon disengagement of said mechanical clutch, said fluid clutch maintaining a desired differential speed between said impeller and said turbine when said clutch surfaces are disengaged.

3. A coupling comprising a shaft, an impeller fixedly secured on said shaft, a turbine slidably journalled on said shaft having a housing enclosing said impeller, said turbine and impeller defining mating clutch faces and opposed vanes, inlet means for introducing fluid under pressure into said housing between said housing and the face of said impeller opposite said vanes, said impeller defining an inlet orifice leading from said face to each of said vanes in said impeller, said turbine defining a plurality of outlet orifices opening into each of said vanes in said turbine, said vanes in said turbine providing a pressure area less than the pressure area provided by the portion of said housing opposite said impeller, said outlet orifices having a reduced width relative to said inlet orifices such as to bias said clutch surfaces into engagement when less than a predetermined amount of torque is applied therebetween, said impeller and turbine vanes defining a fluid clutch adapted to cooperate with said clutch surfaces during engagement of said mechanical clutch and to maintain said fluid clutch in engagement during disengagement of said mechanical clutch and a desired differential speed between said impeller and said turbine when said clutch surfaces are disengaged, and check valve means in each of said outlet orifices adapted to open said outlet orifices in response to predetermined centrifugal force to afford disengagement of said clutch surfaces.

4. In combination with an accessory drive pulley journalled in axially fixed relation to an automobile engine or the like, a coupling comprising a shaft rotatably mounted in axially fixed relation to the engine and substantially parallel relation to the axis of said accessory pulley, an impeller fixedly secured to said shaft in predetermined axial relationship to said pulley, a turbine slidably journalled on said shaft, said turbine having a housing enclosing said impeller and defining a wall opposite one face of the impeller, said turbine and impeller defining opposed vanes and complementary clutch surfaces, said turbine vanes having a projected area relative to a plane perpendicular to the axis thereof less than the projected area of the said wall relative to said plane by a predetermined extent, means for introducing fluid under pressure into the space between said wall and said face of said impeller, said impeller defining an inlet orifice leading from said face of said impeller to each of the impeller vanes, said turbine defining an outlet orifice leading from each of the turbine vanes to a fluid source in said means for introducing fluid under pressure into the space between said wall and said impeller, a pulley formed on said housing having an axis parallel to the axis of said accessory drive pulley, and drive means entrained on said pulley on said housing and said accessory drive pulley, said pulley on said housing being axially displaced relative to said accessory drive pulley when said clutch surfaces are in engagement whereby said clutch surfaces are biased into disengaged relationship.

5. A coupling comprising a shaft, an impeller fixedly secured to said shaft, a turbine slidably journalled on said shaft, said impeller and turbine each defining opposed vanes and mating clutch surfaces, and fluid pressure means adapted to urge said clutch surfaces into frictional engagement and to provide a fluid clutch engagement between said vanes, said fluid pressure means including pump means formed by said fluid clutch and outlet means in said turbine adapted to maintain said frictional engagement when the torque between said clutch surfaces is below a predetermined level and to release said frictional engagement and maintain said fluid clutch engagement when the torque between said clutch surfaces is above said predetermined level.

6. A coupling comprising a shaft, an impeller fixedly secured to said shaft, a turbine slidably journalled on said shaft, said impeller and turbine each defining opposed vanes and mating clutch surfaces, and fluid pressure means adapted to urge said clutch surfaces into frictional engagement and to provide a fluid coupling engagement in cooperation with said vanes, means in said coupling responsive to a predetermined speed in said turbine to release said frictional engagement of said clutch surfaces, said impeller and turbine providing a pump to maintain said fluid coupling engagement between said turbine and said impeller during disengagement of said clutch surfaces.

7. A coupling comprising a shaft, an impeller fixedly secured to said shaft, a turbine slidably journalled on said shaft, said impeller and turbine each defining opposed vanes and mating clutch surfaces, fluid pressure means adapted to urge said clutch surfaces into frictional engagement and to provide a fluid coupling engagement in cooperation with said vanes, and means biasing said turbine and said clutch surfaces to disengaged relationship, said fluid pressure means including pump means formed by said impeller and turbine and outlet means adapted to maintain said frictional engagement when the torque between said clutch surfaces is below a predetermined level and to release said frictional engagement and maintain said fluid coupling engagement when the torque between said clutch surfaces is above a predetermined level.

8. A coupling comprising a shaft, an impeller fixedly secured to said shaft, a turbine slidably journalled on said shaft, said impeller and turbine each defining opposed vanes and mating clutch surfaces, fluid pressure means adapted to urge said clutch surfaces into frictional engagement and to provide a fluid coupling engagement in cooperation with said vanes, and means biasing said turbine and said clutch surfaces to disengaged relationship, said fluid pressure means including pump means formed by said impeller and turbine and means responsive to a predetermined speed in said turbine to release said frictional engagement of said clutch surfaces and to maintain said fluid coupling engagement between said turbine and said impeller.

9. A coupling comprising a shaft, an impeller fixedly secured to said shaft, a turbine slidably journalled on said shaft, said impeller and said turbine each defining opposed vanes and mating clutch surfaces, said turbine having a housing receiving said impeller defining a surface disposed in opposed registration to said impeller, means for introducing fluid under pressure into the area between said housing and said impeller, said surface of said housing being dimensioned and configured to afford a greater pressure force thereagainst than the pressure against said impeller from said means for introducing fluid under pressure whereby to effect mechanical engagement of said clutch faces, an outlet passage defined in said turbine leading from one of said vanes in said turbine and an inlet passage in said impeller leading from said area between said housing and said impeller and speed responsive valve means in said impeller adapted to close said inlet passage in said impeller when said impeller has a rate of angular rotation below a predetermined level and to open said inlet passage in said impeller when said impeller has a speed of angular rotation at or above said predetermined level whereby to relieve the pressure between said impeller and said housing and permit disengagement of said clutch faces in response to torque and speed loads therebetween said vanes and said inlet and outlet passages being adapted to maintain a fluid clutch engagement of said coupling of the said disengagement of said clutch surfaces.

10. A coupling comprising a shaft, a turbine slidably journalled on said shaft, an impeller fixedly secured to said shaft, said impeller and said turbine each defining opposed vanes and mating clutch surfaces, housing means carried by said turbine surrounding said impeller and defining differential pressure means therewith, means for introducing fluid under pressure into said housing between said housing and said impeller, bleed means in said impeller for bleeding fluid from said housing to said vanes, outlet means in said turbine for leading fluid from said vanes and speed responsive means adapted to close said bleed means when said impeller is below a predetermined rate of angular rotation and to open said bleed means when said impeller is at or above said predetermined rate of angular rotation, said differential pressure surfaces being dimensioned to maintain said clutch surfaces in engagement when said impeller is below said predetermined rate of angular rotation and said bleed means being adapted to relieve the pressure between said housing and said impeller when said impeller is at or above said predetermined rate of angular rotation whereby to disengage said clutch surfaces.

11. In combination with a pulley for driving an automobile accessory or the like and means for rotatably supporting said pulley, a coupling comprising an impeller, a turbine, means supporting said impeller and turbine for relative axial movement, a mechanical clutch defined by said impeller and turbine, a fluid clutch defined by said impeller and turbine, means adapted to engage said mechanical clutch and fluid clutch when the torque on said impeller is below a predetermined level and to disengage said mechanical clutch above said predetermined level, pump means formed by said impeller and turbine to maintain the engagement of said fluid clutch when the torque on said impeller is above said predetermined level, said pulley being driven by said turbine.

12. In combination with a pulley for driving an automobile accessory or the like and means for rotatably supporting said pulley, a coupling comprising a shaft, an impeller fixedly secured to said shaft, a turbine slidably journalled on said shaft, said impeller and said turbine each defining opposed vanes and mating clutch surfaces, said turbine having a housing receiving said impeller defining a surface disposed in opposed registration to said impeller, means for introducing fluid under pressure into the area between said housing and said impeller, said surface of said housing being dimensioned and configured to afford a greater pressure force thereagainst than the pressure against said impeller from said means for introducing fluid under pressure whereby to effect mechanical engagement of said clutch faces, an outlet passage defined in said turbine leading from one of said vanes in said turbine and an inlet passage in said impeller leading from said area between said housing and said impeller, speed responsive valve means in said impeller adapted to close said inlet passage in said impeller when said impeller has a rate of angular rotation below a predetermined level and to open said inlet passage in said impeller when said impeller has a speed of angular rotation at or above said predetermined level whereby to relieve the pressure between said impeller and said housing and permit disengagement of said clutch faces in response to torque and speed loads therebetween, said vanes and said inlet and outlet passages being adapted to maintain a fluid clutch engagement of said coupling upon the said disengagement of said clutch surfaces, a pulley on said turbine, drive means entrained around said pulley on said turbine and said first named pulley and drive means for rotating said shaft.

13. In combination with an engine having a crankshaft, an accessory such as a fan or the like and a pulley for driving said accessory, an impeller fixedly secured to said shaft, a turbine slidably journalled on said shaft, said impeller and said turbine each defining opposed vanes and mating clutch surfaces, said turbine having a housing receiving said impeller defining a surface disposed in opposed registration to said impeller, means for introducing fluid under pressure into the area between said housing and said impeller, said surface of said housing being dimensioned and configured to afford a greater pressure force thereagainst than the pressure against said impeller from said means for introducing fluid under pressure whereby to effect mechanical engagement of said clutch faces, outlet means defined in said turbine leading from said vanes in said turbine and inlet means in said impeller leading from said area between said housing to said vanes in said impeller, speed responsive valve means in said inlet means adapted to close said inlet means in said impeller when said impeller has a rate of angular rotation below a predetemined level and to open said inlet means in said impeller when said impeller has a speed of angular rotation at or above said predetermined level whereby to relieve the pressure between said impeller and said housing and permit disengagement of said clutch faces in response to torque and speed loads therebetween, said vanes and said inlet and outlet means being adapted to maintain a fluid clutch engagement of said coupling upon the said disengagement of said clutch surfaces, a pulley on said turbine and drive means entrained around said pulley on said turbine and said pulley for driving said accessory.

14. In combination with an engine having a crankshaft, an accessory such as a fan or the like and a pulley for driving said accessory, a coupling comprising, an impeller, a turbine, said impeller and turbine being mounted on said crankshaft for relative axial and rotative movement, a mechanical clutch defined by said impeller and turbine, a fluid clutch defined by said impeller and turbine, fluid pressure means adapted to engage said mechanical clutch and said fluid clutch, said fluid pressure means including pump means formed by said impeller and turbine and speed responsive means adapted to release said mechanical clutch in response to a predetermined speed of angular rotation in said impeller, said pump means maintaining said fluid clutch in engagement during release of said mechanical clutch.

15. A coupling comprising an impeller, a turbine, means supporting said impeller and said turbine for relative axial movement, a mechanical clutch defined by said impeller and said turbine, a fluid clutch defined by said impeller and said turbine, means adapted to engage said mechanical clutch and said fluid clutch when the torque on said impeller is below a predetermined level and to disengage said mechanical clutch when the torque on said impeller is above said predetermined level and a pump defined by said impeller and said turbine to maintain the disengagement of said mechanical clutch and the engagement of said fluid clutch when the torque on said impeller is above said predetermined level.

16. A mechanical and fluid accessory drive coupling comprising a shaft, an impeller, a turbine, said impeller and said turbine being mounted on said shaft for relative axial and rotative movement, a mechanical clutch defined by said impeller and said turbine, a fluid clutch defined by said impeller and said turbine, and speed responsive means adapted to engage said mechanical clutch and said fluid clutch in response to a relatively low rate of angular rotation in said turbine and to disengage said mechanical clutch in response to a higher rate of angular rotation in said turbine.

References Cited in the file of this patent

UNITED STATES PATENTS

| | | |
|---|---|---|
| 1,298,990 | Mason | Apr. 1, 1919 |
| 2,397,862 | Jencick | Apr. 2, 1946 |
| 2,521,117 | DuBois et al. | Sept. 5, 1950 |
| 2,731,119 | Burdett et al. | Jan. 17, 1956 |
| 2,860,747 | Kelley | Nov. 18, 1958 |
| 2,920,728 | Forster | Jan. 12, 1960 |
| 2,986,955 | Herbenar | June 6, 1961 |

FOREIGN PATENTS

| | | |
|---|---|---|
| 668,839 | France | Nov. 7, 1929 |